United States Patent
Oteri et al.

(10) Patent No.: US 12,035,407 B2
(45) Date of Patent: Jul. 9, 2024

(54) SYSTEM AND METHOD FOR SIMULTANEOUS UL CANCELLATION AND UL CI MONITORING

(71) Applicant: Apple Inc., Cupertino, CA (US)

(72) Inventors: Oghenekome Oteri, San Diego, CA (US); Dawei Zhang, Saratoga, CA (US); Hong He, Cupertino, CA (US); Keith W. Saints, Cupertino, CA (US); Wei Zeng, San Diego, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 288 days.

(21) Appl. No.: 17/225,640

(22) Filed: Apr. 8, 2021

(65) Prior Publication Data

US 2021/0321482 A1 Oct. 14, 2021

Related U.S. Application Data

(60) Provisional application No. 63/007,141, filed on Apr. 8, 2020.

(51) Int. Cl.
*H04W 76/36* (2018.01)
*H04W 72/0446* (2023.01)
(Continued)

(52) U.S. Cl.
CPC ....... *H04W 76/36* (2018.02); *H04W 72/0446* (2013.01); *H04W 72/21* (2023.01); *H04W 72/56* (2023.01)

(58) Field of Classification Search
None
See application file for complete search history.

(56) References Cited

U.S. PATENT DOCUMENTS

| 2019/0081754 A1* | 3/2019 | Cheng | H04L 5/0051 |
| 2020/0229202 A1* | 7/2020 | Bagheri | H04L 25/0226 |

(Continued)

FOREIGN PATENT DOCUMENTS

| CN | 110366245 A | 10/2019 |
| WO | 2018233512 A1 | 12/2018 |

(Continued)

OTHER PUBLICATIONS

Apple Inc., "Remaining Details on Enhanced Inter-UE Prioritization/Multiplexing," 3GPP Draft, R1-2000857, 3rd Generation Partnership Project (3GPP), vol. RAN WG1, No. e-Meeting, Feb. 24, 2020-Mar. 6, 2020, Feb. 15, 2020, XP05183475, Retrieved from the Internet: URL: https://ftp.3gpp.org/tsg_ran/WG1_RL1/TSGR1_100_e/Docs/R1-2000857.zip [retrieved on Feb. 15, 2020].

(Continued)

*Primary Examiner* — Chi H Pham
*Assistant Examiner* — Raul Rivas
(74) *Attorney, Agent, or Firm* — Blank Rome LLP

(57) ABSTRACT

An example method for wireless communication includes: receiving, by a wireless station, an uplink transmission from a wireless device of a set of two or more wireless devices; determining, by the wireless station, a need for a higher priority uplink transmission; determining, by the wireless station, a minimum cancellation processing time for the set of two or more wireless devices; and transmitting an uplink cancellation request to the set of two or more wireless devices based on the minimum cancellation processing time.

17 Claims, 14 Drawing Sheets

(51) Int. Cl.
*H04W 72/21*    (2023.01)
*H04W 72/56*    (2023.01)

(56) References Cited

U.S. PATENT DOCUMENTS

| | | | | |
|---|---|---|---|---|
| 2020/0344747 | A1* | 10/2020 | Park | H04W 72/21 |
| 2021/0022134 | A1* | 1/2021 | Chen | H04L 5/0078 |
| 2021/0168783 | A1* | 6/2021 | Islam | H04W 72/23 |
| 2021/0400644 | A1* | 12/2021 | Islam | H04L 5/0051 |
| 2022/0132587 | A1* | 4/2022 | Agiwal | H04W 74/0833 |

FOREIGN PATENT DOCUMENTS

| | | |
|---|---|---|
| WO | 2019160332 A1 | 8/2019 |
| WO | 2019194663 A1 | 10/2019 |
| WO | 2020033660 A1 | 2/2020 |

OTHER PUBLICATIONS

Huawei, HiSilicon, "UL inter-UE transmission prioritization and multiplexing," R1-1910070, 3GPP TSG RAN WG1 Meeting #98bis, Oct. 8, 2019.

\* cited by examiner

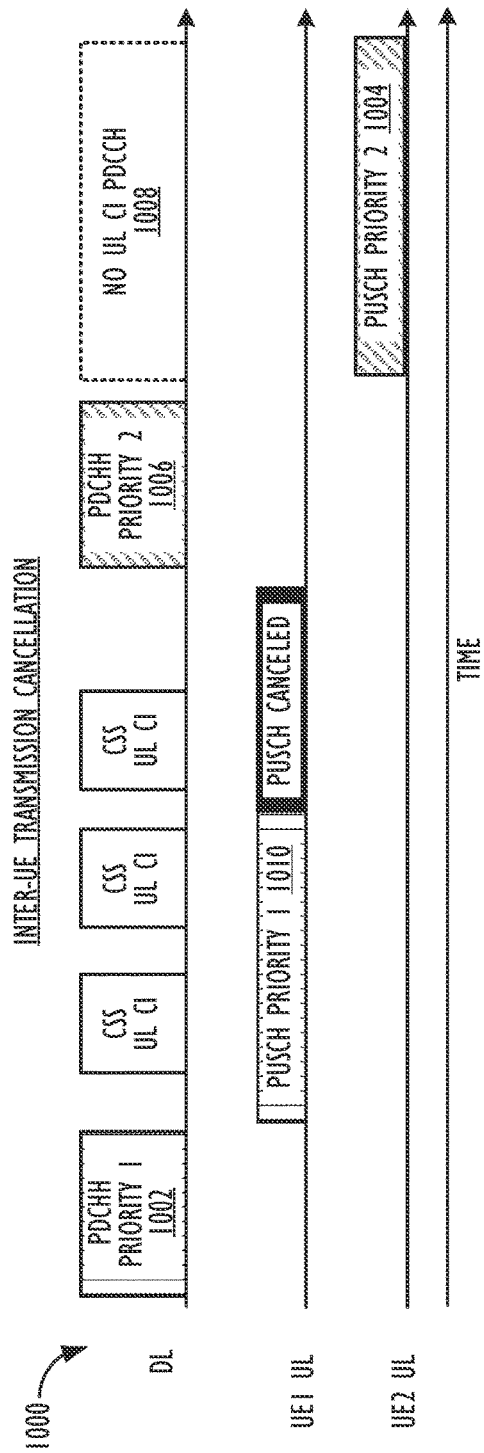
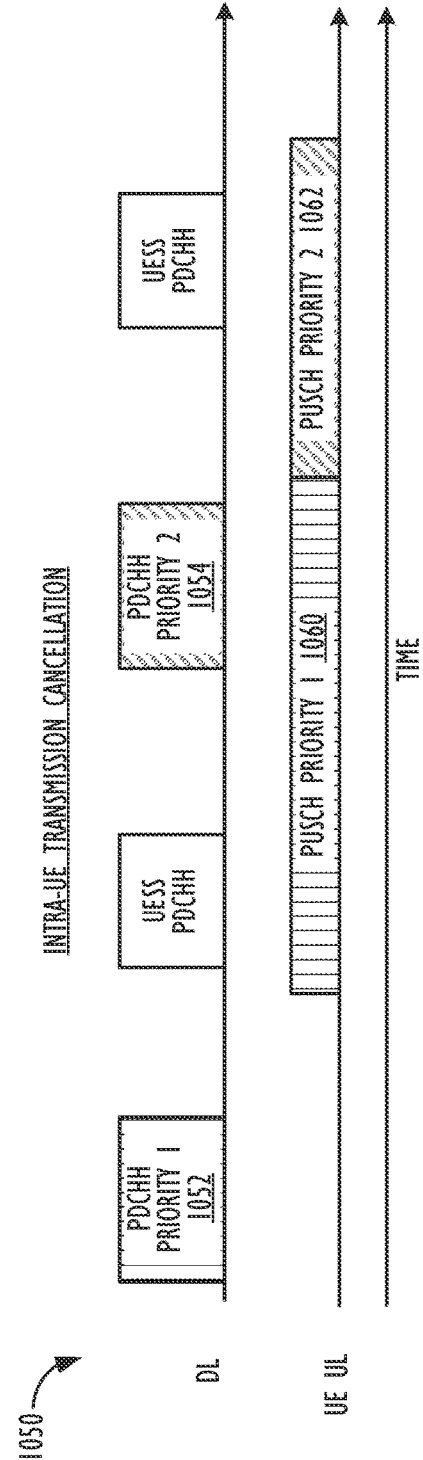
FIG. 10A
FIG. 10B

1230

DETERMINE, BY THE WIRELESS STATION, A MINIMUM CANCELLATION PROCESSING TIME FOR THE SET OF TWO OR MORE WIRELESS DEVICES

1232

IDENTIFY, BY THE WIRELESS STATION, A MINIMUM CANCELLATION PROCESSING TIME ASSOCIATED WITH EACH WIRELESS DEVICE OF THE SET OF TWO OR MORE WIRELESS DEVICES, AND DETERMINE A LARGEST MINIMUM CANCELLATION PROCESSING TIME OF THE IDENTIFIED MINIMUM CANCELLATION PROCESSING TIMES OF THE SET OF TWO OR MORE WIRELESS DEVICES, WHEREIN THE MINIMUM CANCELLATION TIME IS THE DETERMINED LARGEST MINIMUM CANCELLATION PROCESSING TIME

1234

IDENTIFY, BY THE WIRELESS STATION, A MINIMUM CANCELLATION PROCESSING TIME ASSOCIATED WITH EACH WIRELESS DEVICE OF THE SET OF TWO OR MORE WIRELESS DEVICES, AND DETERMINE A SHORTEST MINIMUM CANCELLATION PROCESSING TIME OF THE IDENTIFIED MINIMUM CANCELLATION PROCESSING TIMES OF THE SET OF TWO OR MORE WIRELESS DEVICES, WHEREIN THE MINIMUM CANCELLATION TIME IS THE DETERMINED SHORTEST MINIMUM CANCELLATION PROCESSING TIME

1236

IDENTIFY, BY THE WIRELESS STATION, A MINIMUM CANCELLATION PROCESSING TIME ASSOCIATED WITH EACH WIRELESS DEVICE OF THE SET OF TWO OR MORE WIRELESS DEVICES, AND ASSIGN A COMMON CANCELLATION PROCESSING TIME WITH A UE-SPECIFIC OFFSET FOR EACH WIRELESS DEVICE INDICATING MINIMUM CANCELLATION PROCESSING TIMES OF THE WIRELESS DEVICES BASED ON THE IDENTIFIED MINIMUM CANCELLATION PROCESSING TIMES, AND WHEREIN THE UPLINK CANCELLATION REQUEST INCLUDES A COMMON BITMAP FOR THE CANCELLATION REGION

*FIG. 13*

SYSTEM AND METHOD FOR SIMULTANEOUS UL CANCELLATION AND UL CI MONITORING

CROSS-REFERENCE TO RELATED APPLICATIONS FIELD

The present application claims priority benefit of U.S. Provisional Application No. 63/007,141, filed Apr. 8, 2020, and entitled "SYSTEM AND METHOD FOR SIMULTANEOUS UL CANCELLATION AND UL CI MONITORING," which is hereby incorporated herein by reference.

FIELD

The present application relates to wireless devices, and more particularly to apparatus, systems, and methods for performing simultaneous Uplink (UL) Cancellation and UL Cancellation Indication (CI) monitoring in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for performing simultaneous UL Cancellation and UL CI monitoring.

In certain cases, a scheduled transmission of a User Equipment (UE) may need to be canceled to allow another UE to transmit. Certain wireless systems include different categories of UEs associated with different priorities. For example, 5G-NR systems may include enhanced mobile broadband (eMBB) devices, which can include traditional UE devices, such as mobile devices, wireless devices, computing devices, etc., as well as Ultra-Reliable Low-Latency Communication (URLLC) devices. Of note, 5G-NR systems may include other categories of devices which have been omitted for clarity, but to which the techniques discussed herein, may apply. These URLLC devices are devices that support emerging latency-sensitive multimedia use cases and applications, such as augment/virtual reality systems, telemedicine, UltraHD, autonomous vehicles and devices, etc. These URLLC devices are expected to need a relatively large amount of bandwidth with minimal delays (e.g., low latency). To help provide low latency, URLLC devices may be prioritized over eMBB devices. As a part of prioritization, a scheduled uplink period of an eMBB may be canceled before a transmitting eMBB is done transmitting.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which:

FIGS. 10A and 10B illustrate timing diagrams for monitoring, in accordance with aspects of the present disclosure;

FIG. 13 illustrates an example flowchart of a technique for wireless communications, in accordance with aspects of the present disclosure;

Figure 1:
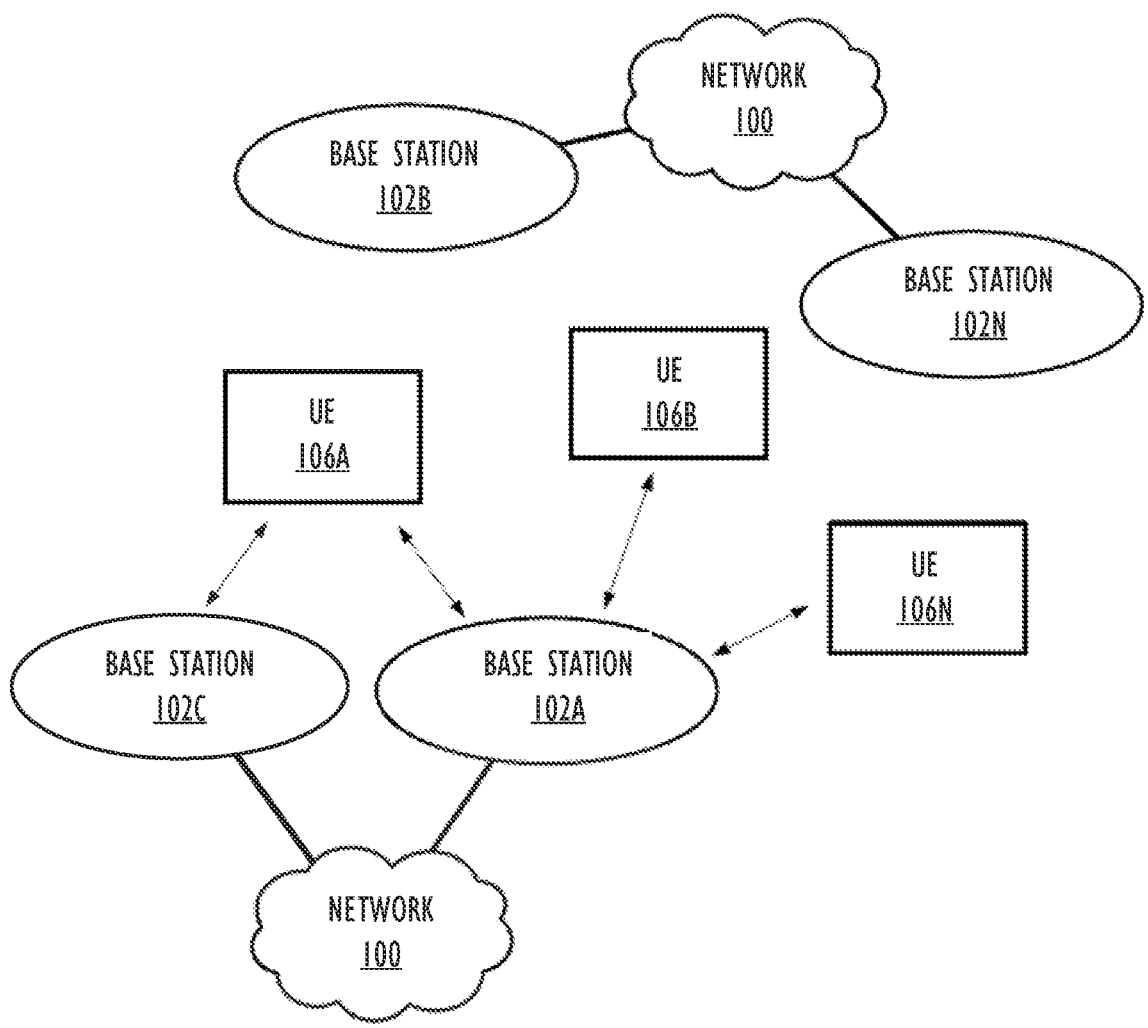
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In RAN1 Meeting #98, it was agreed that the reference time region where a detected UL CI is applicable would be determined according to the following rules: (1) the reference time region starts from X symbols (e.g., orthogonal frequency-division modulation (OFDM) symbols or Discrete Fourier Transform (DFT) spread OFDM (DFT-s-OFDM) symbols) after the ending symbol of the Physical Downlink Control Channel (PDCCH) Control Resource Set (CORESET) carrying the UL CI (where X is at least equal to the minimum processing time for UL cancelation); and (2) X can also possibly be configured to be larger than the minimum processing time for UL cancelation.

Thus, for a single UE, it would be beneficial to define the minimum processing time for UL cancellation and finalize its signaling method. For example, in the case that a gNodeB (gNB) has multiple Enhanced Mobile Broadband (eMBB) UEs to cancel and is signaling those UEs with a Group Common PDCCH (GC-PDCCH), it has not been previously defined how the value of X would be estimated (either a common value of X or a UE-specific value of X) and how each UE would receive the value of X. This problem is also similar to the scenario in which the UEs may have misaligned start times of the reference region, e.g., due to different Timing Advances (TAs) across the UEs to ensure that the transmitted packet from each UE reaches the gNB at the same time (or in an overlapped manner).

In RAN1 Meetings #98 and #99, the following agreements were also made: (1) there will be no enhancement to PDCCH monitoring capability (i.e., the number of blind decodes (BDs) and non-overlapping control channel elements (CCEs)) specifically for UL CI monitoring purposes; and (2) up to Y BDs can be configured for UL CI, e.g., either per-UL CI monitoring occasion or per-span. Further, the UE is not expected to be configured with search space configuration for UL CI with Aggregation Level (AL) and the of number of candidates exceeding Y BDs. Thus, it would also be beneficial to define what value Y has and how it is decided.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Turning now to FIG. 1, a simplified example of a wireless communication system is illustrated, according to some embodiments. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB." In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
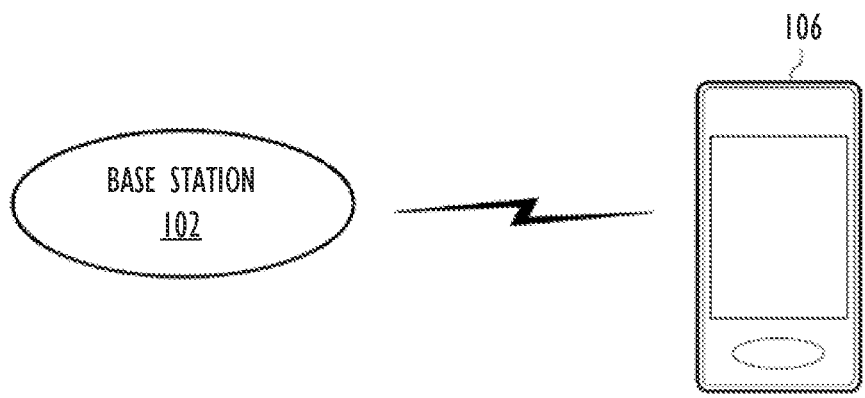
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
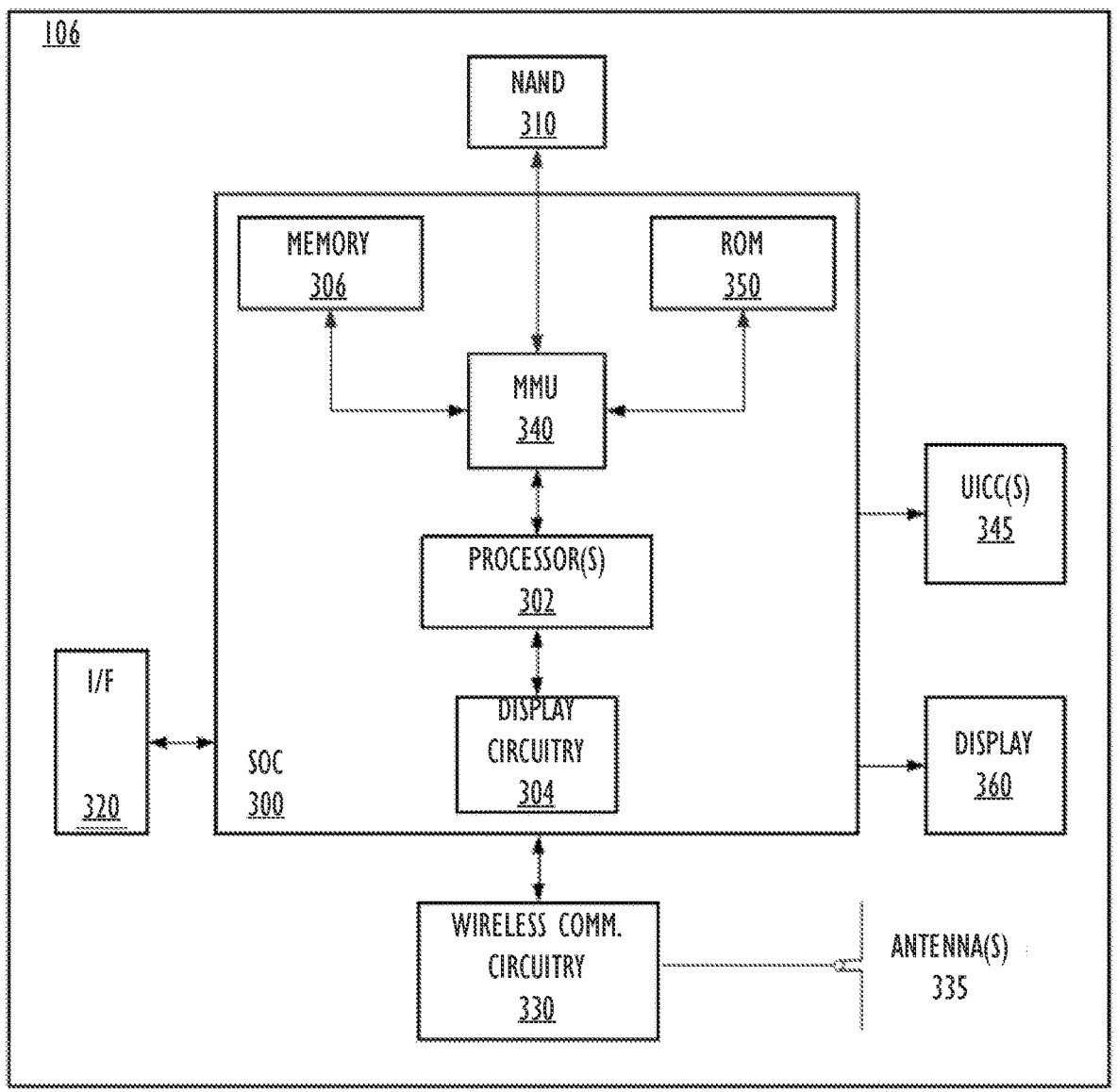
FIG. 3 illustrates an example block diagram of a UE, according to some Embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/ or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
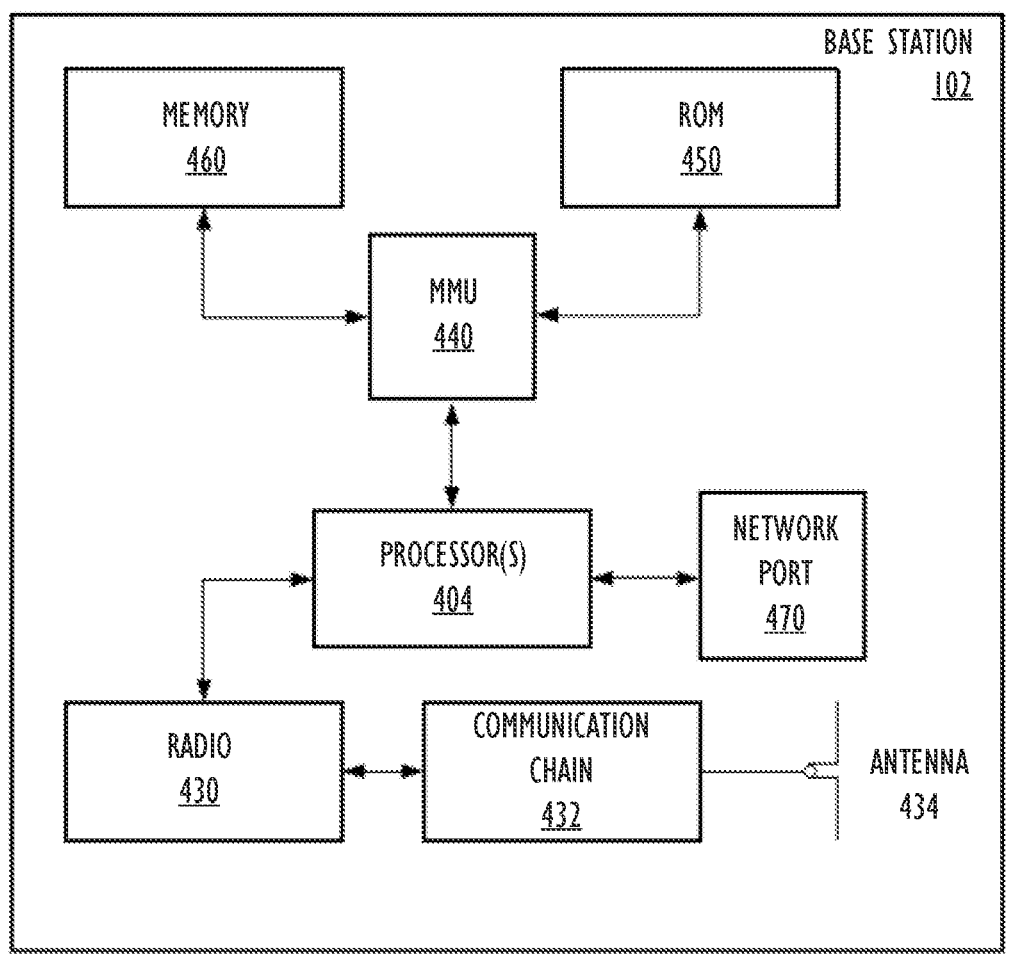
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB." In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
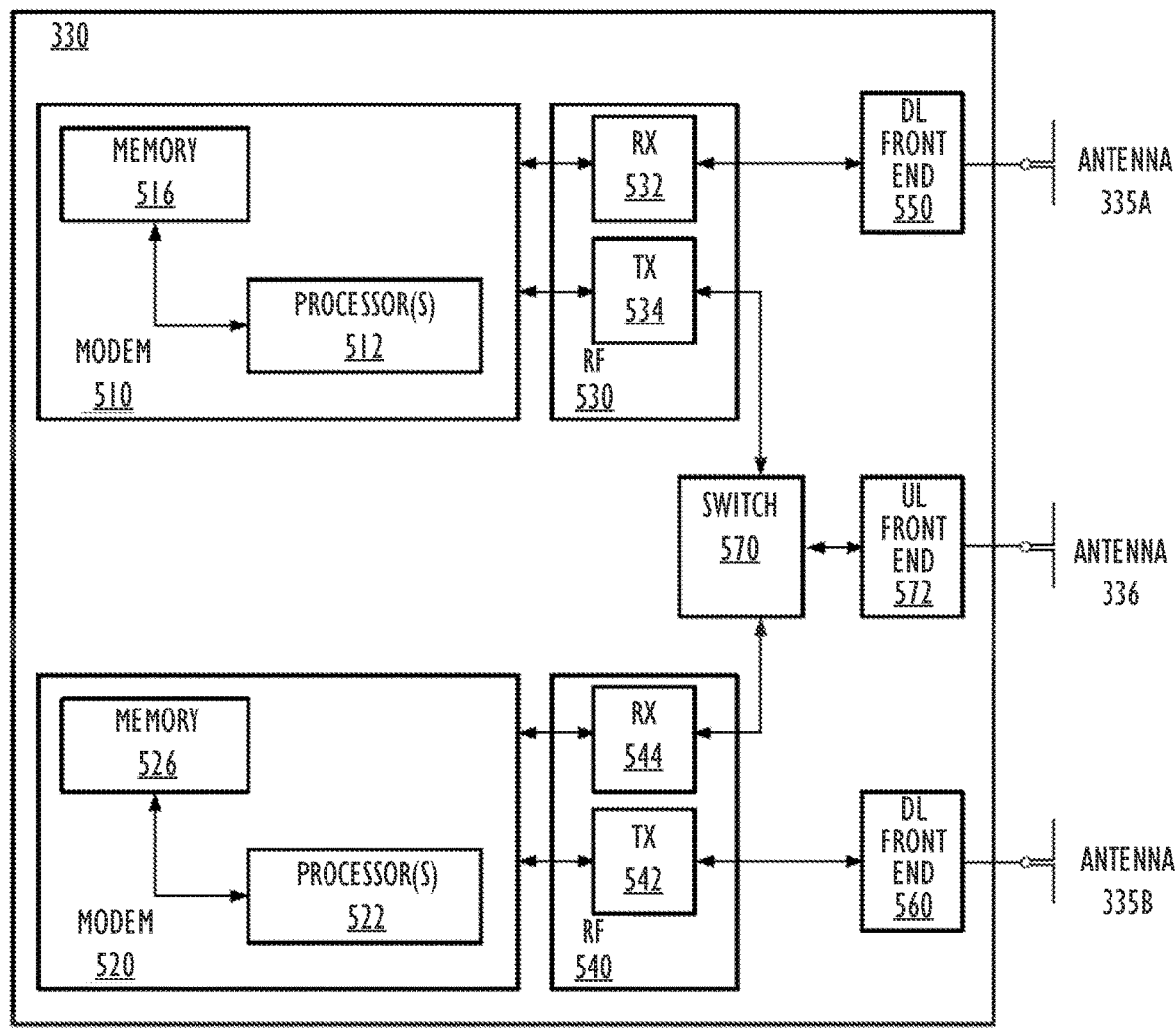
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
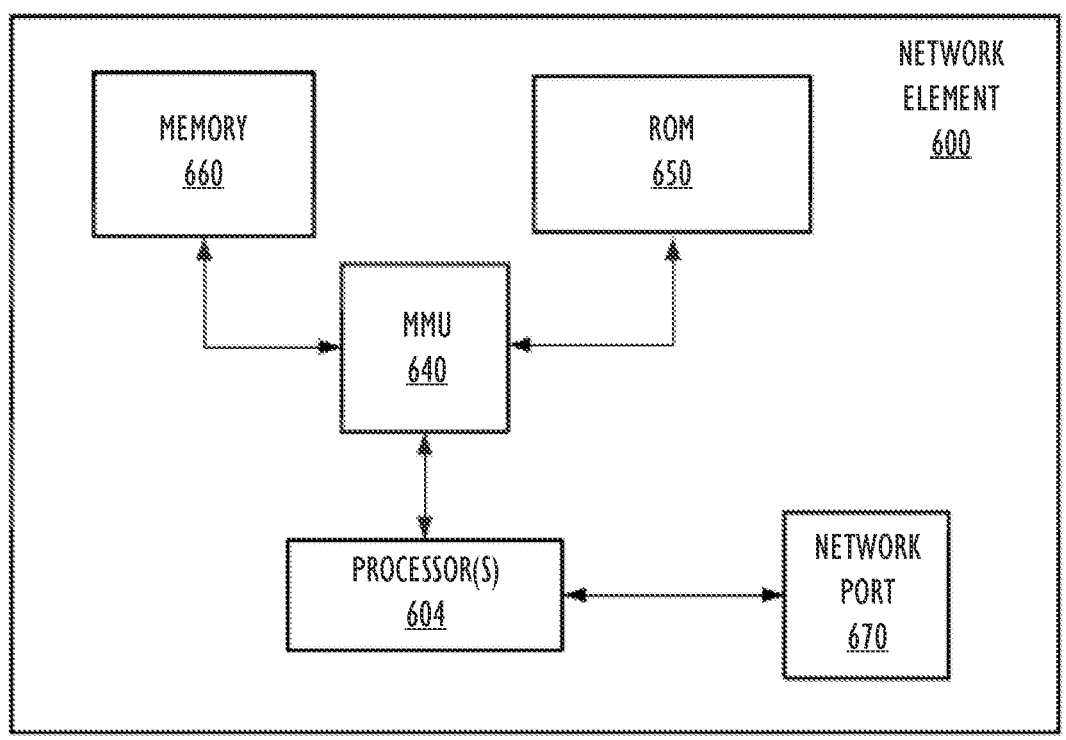
FIG. 6 illustrates an example block diagram of a network element, according to some embodiments.

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
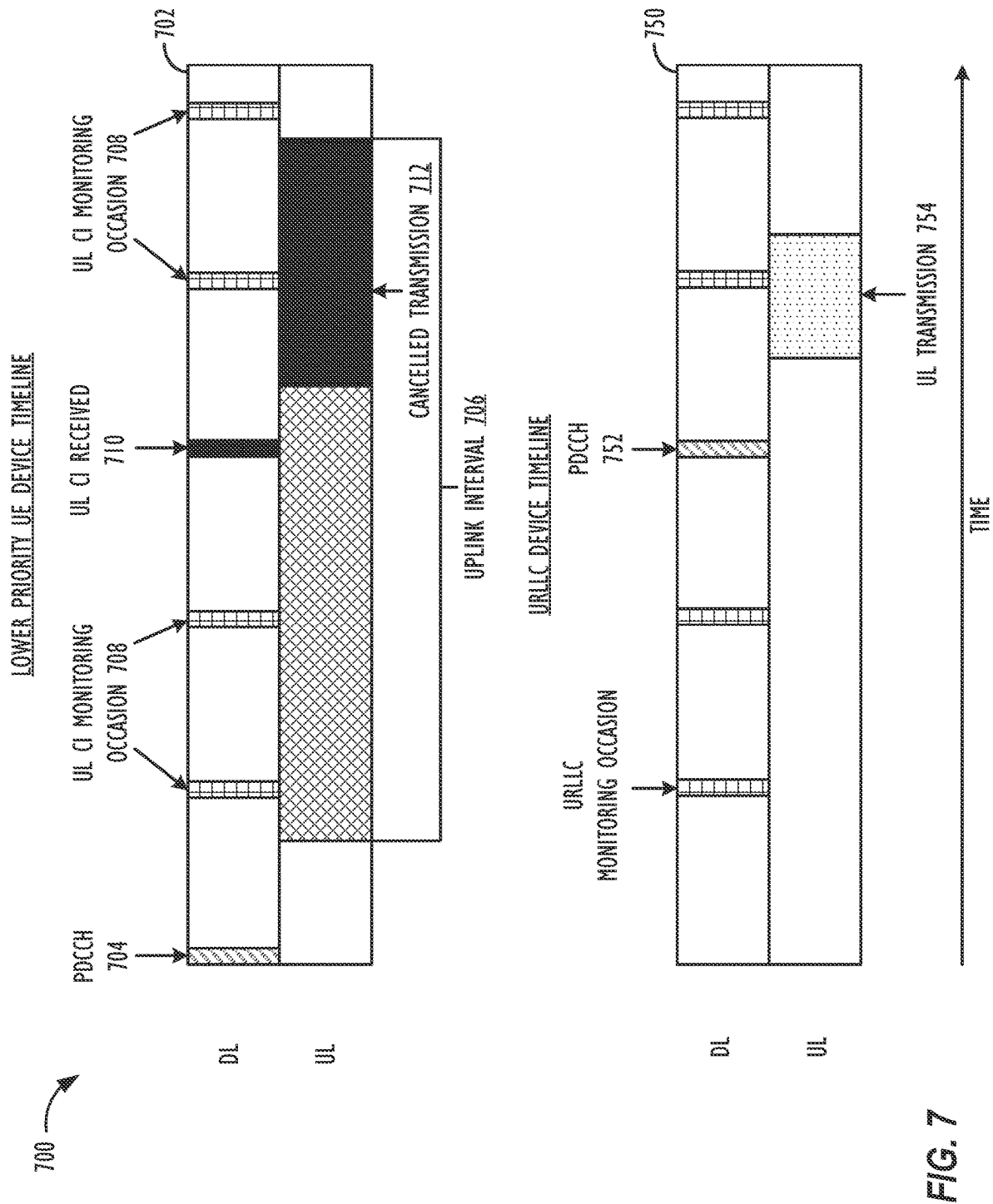
FIG. 7 illustrates an example timing diagram of an uplink cancellation, in accordance with aspects of the present disclosure.

FIG. 7 illustrates an example timing diagram 700 of an uplink cancellation 700, in accordance with aspects of the present disclosure. The timing diagram 700 includes a timeline for a lower priority UE device 702 and a timeline for a higher priority UE device 750 for a single period of time. As an example, the lower priority UE device 702 may be an eMBB device, massive machine type communication (mMTC) device, etc., and the higher priority UE device 750 may be a URLLC device. As shown, the lower priority UE device 702 receives a lower priority UE device PDCCH message 704 scheduling an uplink interval 706, during which the lower priority UE device 702 may transmit. In certain cases, the lower priority UE device PDCCH message 704 may be sent to and provide a transmission and reception schedule for multiple lower priority UE devices. To facilitate canceling a scheduled uplink of a UE during transmission, the UE may listen for an uplink cancellation indication (UL CI) during defined UL CI monitoring occasions 708. In certain cases, UL CI may be sending using a new radio network temporary identifier (RNTI), such as a cancellation indication RNTI (CI-RNTI). The UL CI message helps allow specific transmissions and/or repetitions to be canceled individually. Upon receipt of the UL CI 710 during a monitoring occasion, the lower priority UE device 702 may cancel its uplink 712 by stopping its transmission. By stopping the transmission of the lower priority UE device 702, the higher priority UE device 750 may be scheduled, e.g., via a higher priority UE device PDCCH 752, to transmit 754 without interference. By canceling the uplink from the lower-priority UE device, the higher priority UE device is able to transmit without having to wait for the full uplink interval 706 of the lower priority UE device to pass. In certain cases, the canceled UE does not automatically resume transmitting, but may be rescheduled at a later time, for example by another lower priority UE device PDCCH message.

In certain cases, the UL CI may include a 2D bitmap indicating a time and frequency resource region being canceled. The UL CI defines a reference time region in time and frequency within which the UL CI is to be applied. The reference time region for which a UL CI is applicable starts X symbols after the ending symbol of the PDCCH CORESET carrying the UL CI. A CORESET is a set of physical resources, such as a downlink resource grid, and a set of parameters used to carry the PDCCH/Downlink Control Information (DCI). After receiving a UL CI, a UE needs a certain amount of time to process and act on the UL CI message. The minimum processing time, in symbols, needed by the UE to decode the PDCCH message and stop transmitting is represented by the variable X. Determining X allows a wireless station to determine and signal to a higher priority UE when the higher priority UE can transmit. Where only a single UE needs to be canceled, determining X is straight-forward, and a signaling method for the single UE is known. Where a wireless station needs to signal a cancel to multiple wireless stations, determining X and determining how each UE receives X is more challenging, as X may be UE-dependent. Additionally, UEs have a limited amount of resources for monitoring the PDCCH. Often, UEs have to monitor PDCCH for a wide variety of possible messages. A PDCCH messages include a downlink resource grid, on which messages for multiple UEs may be spread (e.g., a PDCCH search space), and UEs can only attempt a finite number of decode attempts (e.g., blind decodes (BDs)) of the PDCCH/DCI. A variable, Y, represents a number of BDs available for a UE to use for monitoring for UL CI. What is needed is a technique for determining a length of time needed for a UL CI to be implemented and when UEs can monitor for such UL CIs.

Figure 8:
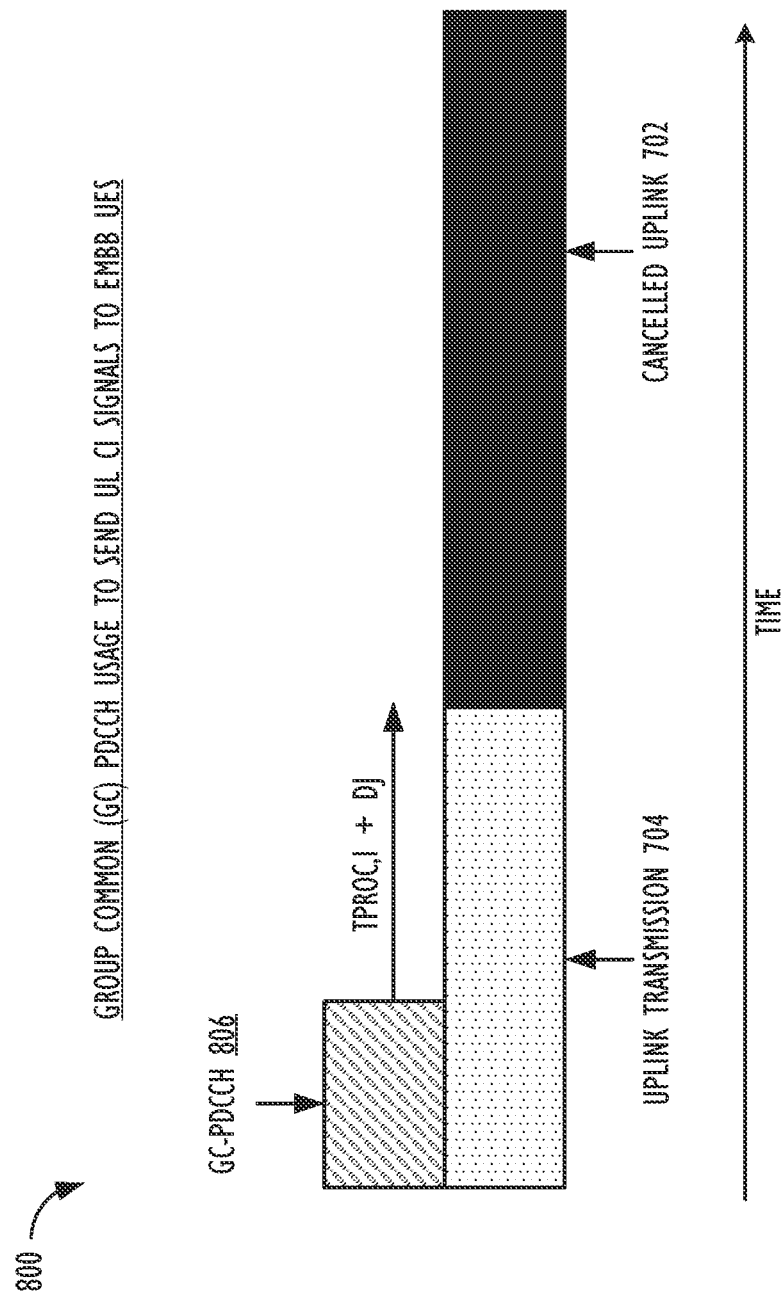
FIG. 8 illustrates an example timing diagram for UL CI processing time, in accordance with aspects of the present disclosure.

FIG. 8 illustrates an example timing diagram for UL CI processing time 800 in accordance with aspects of the present disclosure. The timing diagram for UL CI processing time 800 illustrates a processing time t_proc2 for a UE, representing the minimum processing time needed for a UE to cancel 802 an uplink transmission 804 after receiving the UL CI in a group common (GC) PDCCH message 806. In certain cases, t_proc2 may be based on a defined UE capability, such as UE capability 1 or UE capability 2. This UE capability may correspond to the UE processing time capability for the carrier used to communicate with the UE. In certain cases, additional time may be needed by a UE to reset hardware and cancel the uplink. This additional time may be added to the UE capability level and may be represented by the variable d, where d is a time duration of X number of symbols, where X={0, 1, 2, ..., 14}. In certain cases, d is reported by the UE to the wireless station as a UE capability, for example, during initial registration of the UE with the wireless station. Thus, the UE may be expected to cancel the uplink transmission starting from t_proc2+d after the end of the last symbol of the UL CI.

Figure 9A:
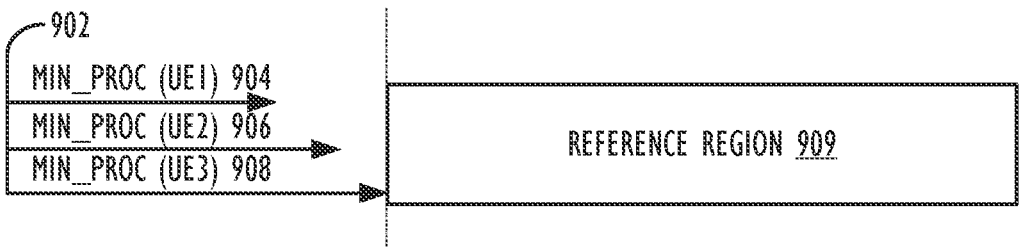
FIGS. 9A-9C illustrate timing diagrams of scenarios for starting a reference time region, in accordance with aspects of the present disclosure.
Figure 9B:
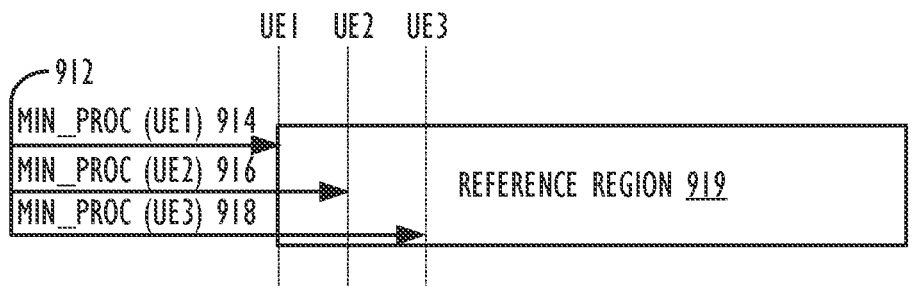
Figure 9C:
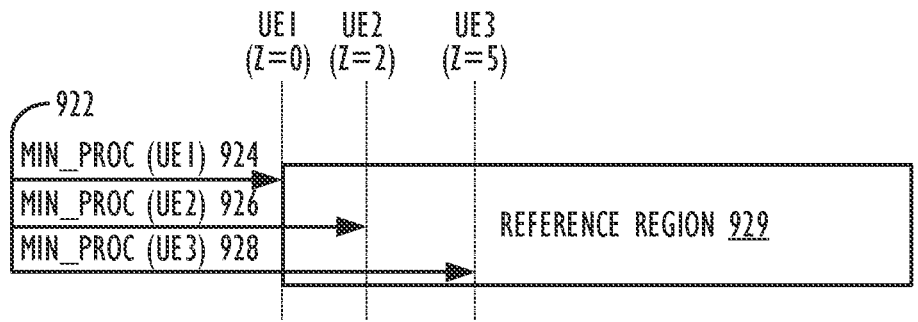

FIGS. 9A-9C illustrate timing diagrams of scenarios for starting a reference time region, in accordance with aspects of the present disclosure. In these three scenarios, the UL CI reference time region starts X symbols after the last symbol of the PDCCH message carrying the UL CI 902, 912, and 922, respectively, for FIG. 9A, FIG. 9B, and FIG. 9C. FIGS. 9A-9C include three UEs: UE1, UE2, and UE3, each with a different associated minimum time needed to cancel an uplink. The amount of time needed by UE1 to cancel an uplink is represented by arrows 904, 914, and 924, respectively, for FIG. 9A, FIG. 9B, and FIG. 9C. Similarly, the amount of time needed by UE2 to cancel an uplink is represented by arrows 906, 926, and 928, respectively, for FIG. 9A, FIG. 9B, and FIG. 9C, and for UE3, arrows 908, 918, and 928, respectively, for FIG. 9A, FIG. 9B, and FIG. 9C.

In first scenario 900, illustrated in FIG. 9A, the start of the reference time region 909 may be set based on the largest minimum processing time from all of the target UEs to be canceled, here UE3 and arrow 908. This scenario uses a single value of X for all of the UEs and this value of X may be signaled as a field in the UL CI, for example, using a GC-PDCCH. In this scenario, the entire reference region may be canceled. In certain cases, the value of X may be dynamic. For example, where the set of UEs to be canceled changes, X may be changed and the GC-PDCCH configuration may be updated. In certain cases, X may be based on the current set of UEs to be canceled. In other cases, X may be based on all possible UEs that may be canceled. This solution may also be used in the case where UE1, UE2, and UE3 have misaligned start times of the reference region, e.g., due to different Timing Advances (TAs) across the UEs.

In the second scenario 910, illustrated in FIG. 9B, X may be set to the smallest of the minimum processing times from all of the target UEs to be canceled. In this scenario, an UL CI for a target UE is limited to the part of the reference time region 919 that is greater than the minimum processing time for that target UE. For example, if there is a specific UE, such as UE1, uplink to be canceled, the wireless station may adjust X based on the minimum processing time for the specific UE, here 914. This solution may also be used in the case where UE1, UE2, and UE3 have misaligned start times of the reference region, e.g., due to different Timing Advances (TAs) across the UEs.

In the third scenario 920, illustrated in FIG. 9C, X may be set per UE (X_UE) to the minimum processing time for that UE. This allows X to be based on the UE processing time of the specific UE to be canceled. Each UE may be configured with a reference time offset value, Z, into the reference time region 929. The UEs may then be sent a common 2D bitmap indicating the different times to cancel the uplink transmission. Each UE may cancel their uplink transmission after X_UE symbols. In some cases, the gNB may signal that the reference region 929 starts from min_proc(UE1) 924 for some or all UEs. A UE is not required to cancel a transmission earlier than X_UE symbols. Note that, in this case, some UEs, e.g., UE 2 and UE 3, may not be able to cancel all the symbols in the reference region, e.g., the symbols that are before the min_proc (UE1)+Z. This solution may also be used in the case where UE1, UE2, and UE3 have misaligned start times of the reference region, e.g., due to different Timing Advances (TAs) across the UEs.

FIGS. 10A and 10B illustrate timing diagrams for monitoring, in accordance with aspects of the present disclosure. In particular, FIG. 10A illustrates monitoring in an inter-UE transmission cancellation scenario 1000. In the inter-UE transmission cancellation scenario 1000, UE1 receives a PDCCH with a first priority via a UE-specific search space (UESS) assigning UE1 an uplink time period and begins transmitting 1010 on PUSCH. The UE monitors a search space, such as a common search space (CSS) at defined monitoring occasions for a GC-PDCCH, including a UL CI. In the inter-UE scenario, the UE may be monitoring CSS for a GC-PDCCH UL CI as the UE may be canceled to allow another UE, such as UE2, to transmit 1004 with a higher priority. UE 2 may receive scheduling PDCCH via UESS 1006. In this scenario, UL CI monitoring occasions may be defined when there is an active PUSCH transmitting at a relatively lower priority. For example, the UE does not need to monitor for a UL CI when the UE is not transmitting on PUSCH 1008.

FIG. 10B, by contrast, illustrates monitoring in an intra-UE prioritization scenario 1050. Here the UE receives a PDCCH 1052 with a first priority via UESS assigning UE1 an uplink time period and begins transmitting 1060 on PUSCH. The UE then receives another PDCCH 1054 with a second, higher priority via UESS and the UE begins transmitting 1062 in response to the higher priority PDCCH 1054. For example, a UE may be running multiple applications, such as one that requires low latency URLLC handling, while another that does not have such requirements. Here, the UE continues to monitor the UESS for PDCCH messages, even after being scheduled to transmit, e.g., in case the UE needs to identify the arrival of a PDCCH scheduling higher priority traffic.

Figure 11:
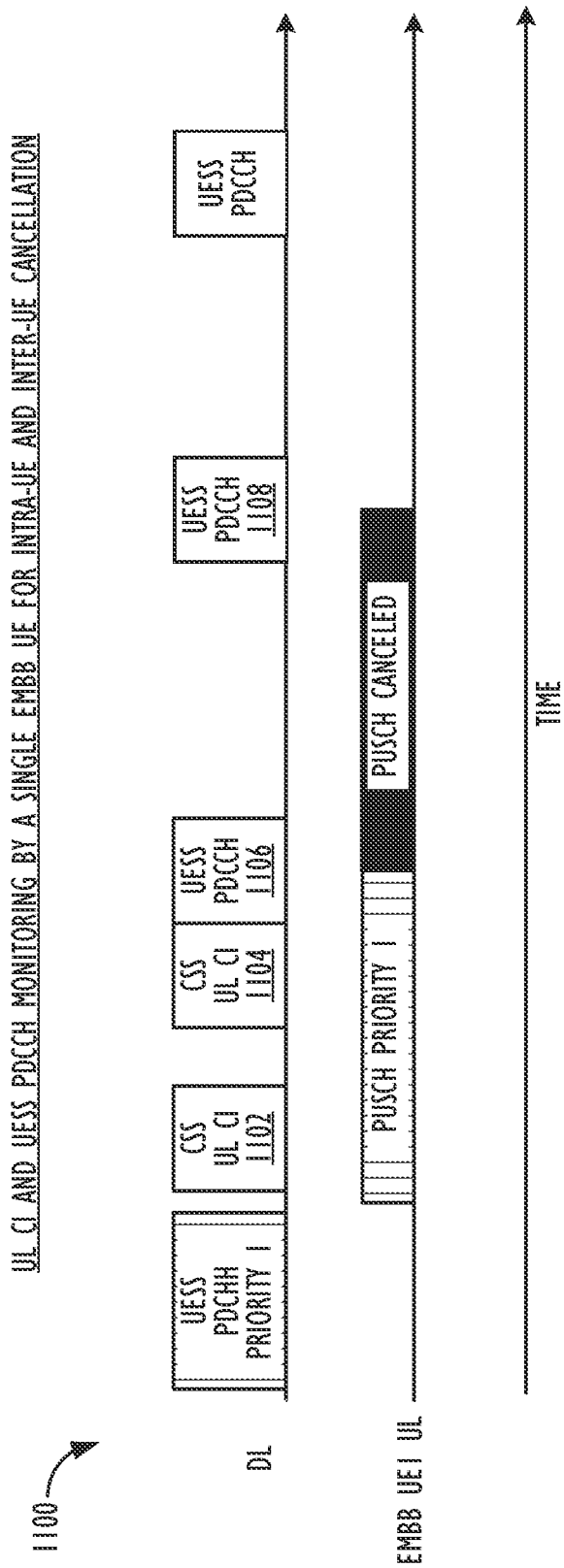
FIG. 11 illustrates an example timing diagram illustrating cancellation monitoring, in accordance with aspects of the present disclosure.

FIG. 11 is a timing diagram illustrating cancellation monitoring 1100, in accordance with aspects of the present disclosure. In this example, a UE is configured to support both intra-UE prioritization, as well as inter-UE cancellation. To handle both intra-UE prioritization, as well as inter-UE cancellation, the UE should monitor both the UESS, for example for a scheduling PDCCH, as well as the CSS, for example for an UL CI without exceed monitoring limits, such as limits on the number of BD or non-overlapping control channel element (CCE) decoding the UE may perform. The UE cannot use all its BD/CCE resources for just UL CI monitoring or just on UESS monitoring. To avoid exceeding the monitoring limits, the UE may split monitoring resources between UL CI monitoring and UESS monitoring. In certain cases, the UE may split monitoring resources based on a predetermined limit. For example, it may be predetermined that the UE may not use more than a certain number (or a percentage) of available BDs/non-overlapping CCEs on UL CI monitoring. For example, UL CI monitoring may be limited to two monitoring occasions 1102 and 1104 and then the UE switches to UESS monitoring 1106 and 1108 for the remainder of the scheduled uplink. In certain cases, the wireless station and the UE may negotiate the amount of processing to be split between UL CI monitoring and UESS PDCCH monitoring. For example, a UE may support different levels of spilt monitoring, such as 0% UL CI monitoring where the UE does not perform UL CI monitoring and is entirely focused on UESS monitoring, 50% where the UE devotes equal processing resources to UL CI monitoring and UESS monitoring, and 100% where the UE does not perform UESS monitoring and is entirely focused on UL CI monitoring.

In a first scenario, the UE may signal the levels of support for split monitoring to the wireless station. In certain cases, this information may be signaled semi-statically, for example as part of UE capability signaling. In other cases, the UE may signal a desired level dynamically, for example, as a part of a scheduling request (SR) resource. In certain cases, signaled levels may indicate additional levels of support. For example, if a UE signals that the UE can support 100% UL CI monitoring, this may imply a configuration of 75%, 50%, 25%, 12.5%, or other percentages are also supported by the UE.

In a second scenario, the wireless station may indicate a required level of support the UE should operate at. In certain cases, the wireless station may configure the UE to this required level. In certain cases, the wireless station may signal the required level dynamically as a part of the UE PDCCH scheduling.

In certain cases, a UE may indicate that the UE supports Rel-15 monitoring limits. In Rel-15, monitoring limit parameters are defined per slot for specific subcarrier spacings (SCSs). For example, a Rel-15 a maximum number of non-overlapping CCEs a Rel-15 UE may monitor per slot can be represented by the variable C, which has defined values at specific supported SCSs. The value of C for 15 kHz SCS is defined as 56. Similarly, C is defined as 56, 48, and 32 for 30 kHz, 60 kHz, and 120 kHz SCS respectively. In Rel-15, a maximum number of blind decodes (BDs) per slot may be represented by the variable M. The value of M also has defined values at specific supported SCSs. The value of M for 15 kHz SCS is defined as 44. Similarly, M is defined as 36, 32, and 32 for 30 kHz, 60 kHz, and 120 kHz SCS respectively. Extending these defined values for different levels of split monitoring of DESS and CSS, based on a percentage, can be shown in Table 1:

TABLE 1

| SCS | C | 100% | 75% | 50% | 25% | 12.50% | 0% |
|---|---|---|---|---|---|---|---|
| 15 kHz | 56 | 56 | 42 | 28 | 14 | 7 | 0 |
| 30 kHz | 56 | 56 | 42 | 28 | 14 | 7 | 0 |
| 60 kHz | 48 | 48 | 36 | 24 | 12 | 6 | 0 |
| 120 kHz | 32 | 32 | 24 | 16 | 8 | 4 | 0 |
| SCS | M | 100% | 75% | 50% | 25% | 12.50% | 0% |
| 15 kHz | 44 | 44 | 33 | 22 | 11 | 5.5 | 0 |
| 30 kHz | 36 | 36 | 27 | 18 | 9 | 4.5 | 0 |
| 60 kHz | 32 | 32 | 24 | 16 | 8 | 4 | 0 |
| 120 kHz | 32 | 32 | 24 | 16 | 8 | 4 | 0 |

In Rel-16, an orthogonal frequency-division modulation (OFDM) frame may be divided into a set of spans of a set number of consecutive OFDM symbols. A PDCCH span pattern may then be defined for a set number and location of spans for each set of spans. For example, a PDCCH span pattern may be in a form of (X,Y), where X represents a gap between a first span of a PDCCH monitoring occasion and another PDCCH monitoring occasion, and Y represents a number of spans to monitor for the PDCCH monitoring occasion. Thus, a PDCCH span pattern of (4,3), e.g., would indicate that the PDCCH monitoring occasion will last for three spans, with no monitoring in a fourth span. This span pattern then repeats for the set of spans. Where a UE indicates support for Rel-16 monitoring, values for C and M may be defined per span for specific SCSs in a way similar to those defined for Rel-15. Values for split monitoring of UESS and CSS may also be similarly defined, based on a percentage, as shown in Table 2:

TABLE 2

| SCS | Configuration | C | 100% | 75% | 50% | 25% | 12.50% | 0% |
|---|---|---|---|---|---|---|---|---|
| 15 kHz | 7.3 | 56 | 56 | 42 | 28 | 14 | 7 | 0 |
| 30 kHz | 7.3 | 56 | 56 | 42 | 28 | 14 | 7 | 0 |
| 15 kHz | 4.3 | 32 | 32 | 24 | 16 | 8 | 4 | 0 |
| 30 kHz | 4.3 | 32 | 32 | 24 | 16 | 8 | 4 | 0 |
| 15 kHz | 2.2 | 16 | 16 | 12 | 8 | 4 | 2 | 0 |
| 30 kHz | 2.2 | 16 | 16 | 12 | 8 | 4 | 2 | 0 |
| SCS | Configuration | M | 100% | 75% | 50% | 25% | 12.50% | 0% |
| 15 kHz | 7.3 | 44 | 44 | 33 | 22 | 11 | 6 | 0 |
| 30 kHz | 7.3 | 36 | 36 | 27 | 18 | 9 | 5 | 0 |
| 15 kHz | 4.3 | 30 | 30 | 23 | 15 | 8 | 4 | 0 |
| 30 kHz | 4.3 | 24 | 24 | 18 | 12 | 6 | 3 | 0 |
| 15 kHz | 2.2 | 13 | 13 | 10 | 7 | 4 | 2 | 0 |
| 30 kHz | 2.2 | 10 | 10 | 8 | 5 | 3 | 2 | 0 |

In accordance with aspects of the present disclosure, a UE may indicate its support for split monitoring of UESS PDCCH and CSS UL CI PDCCH by indicating to the wireless station the UE's PDCCH monitoring capability. For example, the UE may transmit an indication of its overall PDCCH monitoring capability. These indications may include, for example that it supports slot-based (e.g., Rel-15), or span-based (e.g., Rel-16), a level of cancellation supported, such as whether the UE supports UL CI or intra-UE prioritization, whether the UE can be semi-statically or dynamically configured, or some other level of PDCCH monitoring capability. For example, if the UE indicates it only supports slot-based PDCCH monitoring (and not-span based PDDCH monitoring), the UL CI may be limited to once per slot, with a limit of X BDs per monitoring occasion.

In certain cases, if the device can be dynamically configured, the UE may expect to receive, for example from the wireless station, configuration information for dynamic indication of the UL CI levels. For example, when the UE receives a UESS PDCCH for a relatively lower priority uplink traffic, such as eMBB traffic, the UE may also receive, for example via UESS, an indication of the CSS UL CI/USS PDCCH split monitoring level for the duration of the uplink transmission. The UE may then perform UESS/CSS monitoring based on the configured split monitoring level, as described above, for the duration of the uplink transmission. If an UL CI is received during the uplink transmission period, the UE cancels the uplink transmission based on the UL cancellation minimum processing time for UL cancellation, as described above, and stops transmission of the uplink. If an UESS prioritization PDCCH is received during the uplink, the UE takes a UL prioritization minimum processing time for UL prioritization and then the UE switches to the higher priority transmission.

Figure 12:
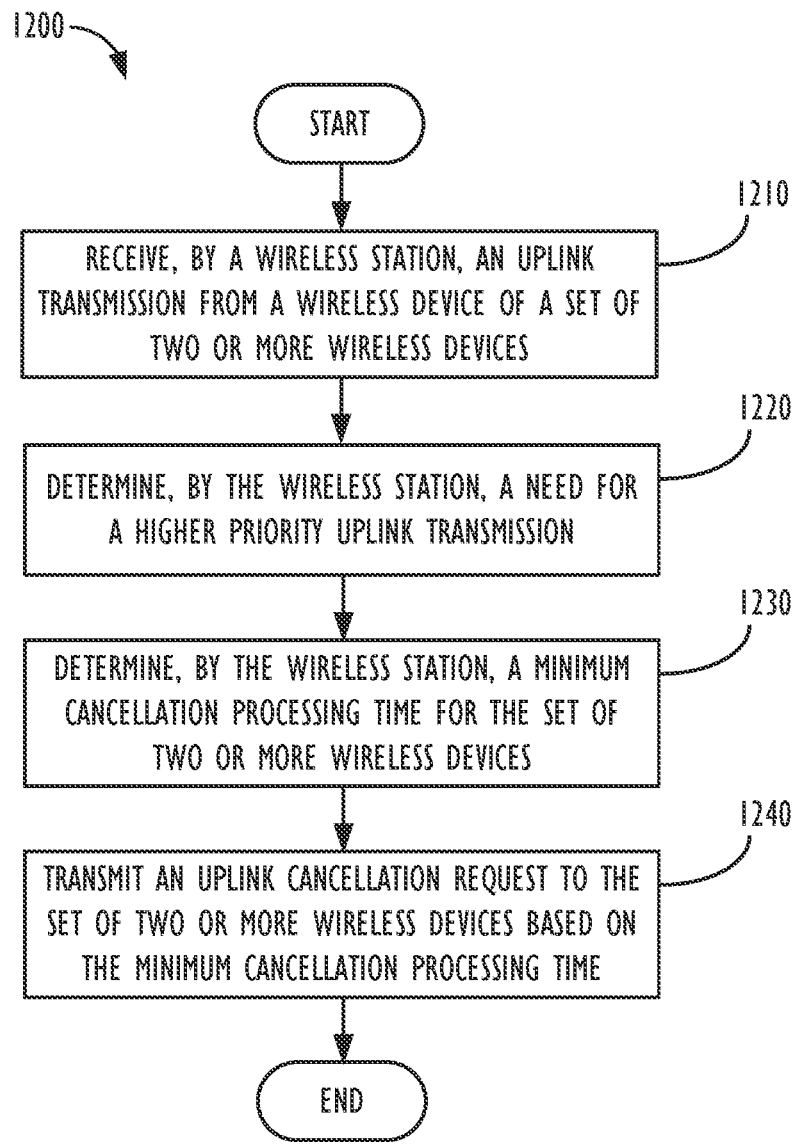
FIG. 12 illustrates an example flowchart of a technique for wireless communications, in accordance with aspects of the present disclosure.

FIG. 12 illustrates a technique for wireless communications 1200, in accordance with aspects of the present disclosure. At block 1210, a wireless station receives an uplink transmission from a wireless device of a set of two or more wireless devices. At block 1220, the wireless station determines a need for a higher priority uplink transmission, as compared to the uplink transmission from the wireless device. At block 1230, the wireless station determines a minimum cancellation processing time for the set of two or more wireless devices. At block 1240, the wireless station transmits an uplink cancellation request to the set of two or more wireless devices based on the determined minimum cancellation processing time.

FIG. 13 illustrates a technique for wireless communications involving further details of block 1230 from FIG. 12, in accordance with aspects of the present disclosure. In certain cases, as shown in block 1232, the minimum cancellation processing time may be determined by identifying a minimum cancellation processing time associated with each wireless device of the set of two or more wireless devices and determining a largest minimum cancellation processing time of the identified minimum cancellation processing times of the set of two or more wireless devices, wherein the minimum cancellation time is the determined largest minimum cancellation processing time. In other cases, as shown in block 1234, the minimum cancellation processing time may be determined by identifying, by the wireless station, a minimum cancellation processing time associated with each wireless device of the set of two or more wireless devices and determining a shortest minimum cancellation processing time of the identified minimum cancellation processing times of the set of two or more wireless devices, wherein the minimum cancellation time is the determined shortest minimum cancellation processing time. In still other cases, as shown in block 1236, the minimum cancellation processing time may be determined by identifying, by the wireless station, a minimum cancellation processing time associated with each wireless device of the set of two or more wireless devices and assigning a common cancellation processing time with a UE-specific offset for each wireless device indicating minimum cancellation processing times of the wireless devices based on the identified minimum cancellation processing times, and wherein the uplink cancellation request includes a common bitmap for the cancellation region.

Figure 14:
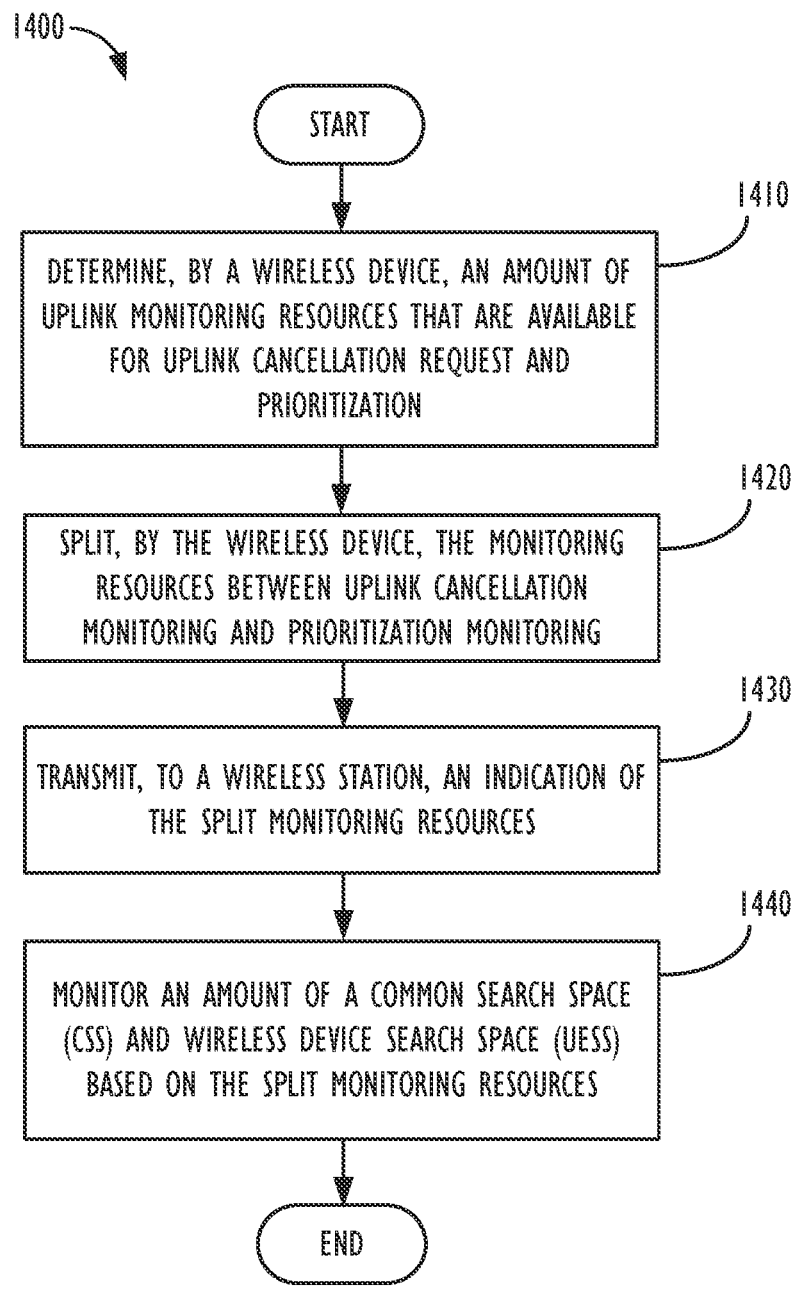
FIG. 14 illustrates an example flowchart of a technique for wireless communications, in accordance with aspects of the present disclosure.

FIG. 14 illustrates a technique for wireless communications 1400, in accordance with aspects of the present disclosure. At block 1410, a wireless device determines an amount of uplink monitoring resources that are available for uplink cancellation request and prioritization. For example, the uplink monitoring resources may comprise BD and non-overlapping CCE monitoring, and the wireless device may determine a number of BDs available for UL CI monitoring and non-overlapping CCEs available for UESS monitoring. At block 1420, the wireless device splits the monitoring resources between uplink cancellation monitoring and prioritization monitoring. For example, the UE may determine a number or percentage of available BD or non-overlapping CCEs that may be used for CSS or UESS monitoring. At block 1430, the wireless device transmits an indication of the split monitoring resources to a wireless station. At block 1440, the wireless device monitors an amount of a CSS and UESS, based on the split monitoring resources.

Figure 15:
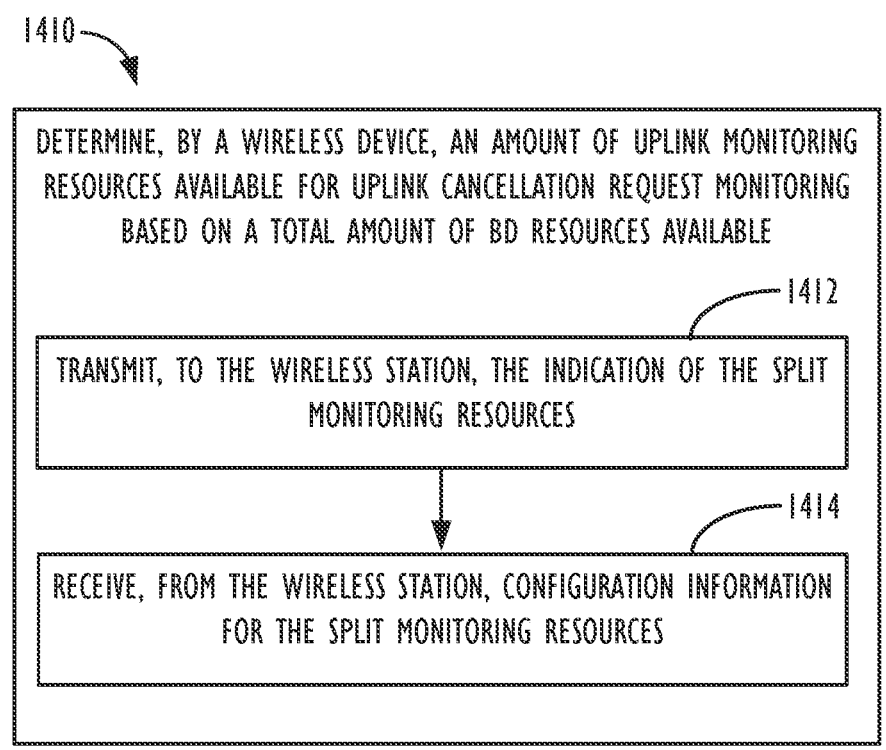
FIG. 15 illustrates an example flowchart of a technique for wireless communications, in accordance with aspects of the present disclosure.

FIG. 15 illustrates a technique for wireless communications involving further details of block 1410 from FIG. 14, in accordance with aspects of the present disclosure. In certain cases, as shown in block 1412, the wireless device may determine an amount of uplink monitoring resources are available by transmitting, to the wireless station, the indication of the split monitoring resources. At block 1414, the wireless device receives, from the wireless station, configuration information for splitting monitoring resources for monitoring CSS and UEESS based on the configuration information.

EXAMPLES

In the following sections, further exemplary embodiments are provided.

According to Example 1, a method is disclosed, comprising: receiving, by a wireless station, an uplink transmission from a wireless device of a set of two or more wireless devices; determining, by the wireless station, a need for a higher priority uplink transmission; determining, by the wireless station, a minimum cancellation processing time for the set of two or more wireless devices; and transmitting an uplink cancellation request to the set of two or more wireless devices based on the minimum cancellation processing time.

Example 2 comprises the subject matter of Example 1, further comprising: identifying, by the wireless station, a minimum cancellation processing time associated with each wireless device of the set of two or more wireless devices; and determining a largest minimum cancellation processing time of the identified minimum cancellation processing times of the set of two or more wireless devices, wherein the minimum cancellation time is the determined largest minimum cancellation processing time.

Example 3 comprises the subject matter of Example 1, further comprising: identifying, by the wireless station, a minimum cancellation processing time associated with each wireless device of the set of two or more wireless devices; and determining a shortest minimum cancellation processing time of the identified minimum cancellation processing times of the set of two or more wireless devices, wherein the minimum cancellation time is the determined shortest minimum cancellation processing time.

Example 4 comprises the subject matter of Example 1, wherein the minimum cancelation processing time is determined by: identifying, by the wireless station, a minimum cancellation processing time associated with each wireless device of the set of two or more wireless devices; and assigning a common cancellation processing time with a UE-specific offset for each wireless device indicating a cancellation region for the wireless devices based on the identified minimum cancellation processing times, and wherein the uplink cancellation request includes a common bitmap for UL cancellation.

Example 5 comprises the subject matter of Example 1, wherein the minimum cancellation processing time is based on a defined wireless device processing capability plus a defined time duration.

Example 6 comprises the subject matter of Example 5, wherein the defined time duration is a number of symbols.

Example 7 comprises the subject matter of Example 1, further comprising scheduling another wireless station to transmit an uplink based on the minimum cancellation time.

According to Example 1, a method is disclosed, comprising: determining, by a wireless device, an amount of uplink monitoring resources that are available for uplink cancellation request and prioritization; splitting, by the wireless device, the monitoring resources between uplink cancellation monitoring and prioritization monitoring; transmitting, to a wireless station, an indication of the split monitoring resources; and monitoring an amount of a common search space (CSS) and wireless device search space (UESS) based on the split monitoring resources.

Example 9 comprises the subject matter of Example 8, wherein the uplink monitoring resources comprise blind decodes (BDs) and control channel element (CCE) monitoring.

Example 10 comprises the subject matter of Example 8, wherein the splitting is based on a number of BDs available or a number of non-overlapping CCE monitoring instances available.

Example 11 comprises the subject matter of Example 8, wherein the splitting is based on a percentage of resources to use for uplink cancellation request monitoring or a percentage of resources to use for prioritization monitoring.

Example 12 comprises the subject matter of Example 8, wherein the amount of uplink monitoring resources available is predetermined.

Example 13 comprises the subject matter of Example 8, wherein the determined amount of uplink monitoring resources available comprises: transmitting, to the wireless station, the indication of the split monitoring resources; and receiving, from the wireless station, configuration information for the split monitoring resources.

According to Example 14, an apparatus is disclosed, comprising: a processor configured to: receive an uplink transmission from a wireless device of a set of two or more wireless devices; determine a need for a higher priority uplink transmission; determine a minimum cancellation processing time for the set of two or more wireless devices; and transmit an uplink cancellation request to the set of two or more wireless devices based on the minimum cancellation processing time.

Example 15 comprises the subject matter of Example 14, wherein the processor is further configured to: identify, by the wireless station, a minimum cancellation processing time associated with each wireless device of the set of two or more wireless devices; and determine a largest minimum cancellation processing time of the identified minimum cancellation processing times of the set of two or more wireless devices, wherein the minimum cancellation time is the determined largest minimum cancellation processing time.

Example 16 comprises the subject matter of Example 14, wherein the processor is further configured to: identify, by the wireless station, a minimum cancellation processing time associated with each wireless device of the set of two or more wireless devices; and determine a shortest minimum cancellation processing time of the identified minimum cancellation processing times of the set of two or more wireless devices, wherein the minimum cancellation time is the determined shortest minimum cancellation processing time.

Example 17 comprises the subject matter of Example 14, wherein the minimum cancelation processing time is determined by: identifying, by the wireless station, a minimum cancellation processing time associated with each wireless device of the set of two or more wireless devices; and assigning a common cancellation processing time with a UE-specific offset for each wireless device indicating a cancellation region for the wireless devices based on the identified minimum cancellation processing times, and wherein the uplink cancellation request includes a common bitmap for UL cancellation.

Example 18 comprises the subject matter of Example 14, wherein the minimum cancellation processing time is based on a defined wireless device processing capability plus a defined time duration.

Example 19 comprises the subject matter of Example 18, wherein the defined time duration is a number of symbols.

Example 20 comprises the subject matter of Example 14, further comprising scheduling another wireless station to transmit an uplink based on the minimum cancellation time.

According to Example 21, an wireless device is disclosed, comprising: an antenna; a radio operably coupled to the antenna; and a processor operably coupled to the radio; wherein the wireless device is configured to: determine an amount of uplink monitoring resources that are available for uplink cancellation request and prioritization; split the monitoring resources between uplink cancellation monitoring and prioritization monitoring; transmit, to a wireless station, an indication of the split monitoring resources; and monitor an amount of a common search space (CSS) and wireless device search space (UESS) based on the split monitoring resources.

Example 22 comprises the subject matter of Example 21, wherein the uplink monitoring resources comprise blind decodes (BDs) and non-overlapping control channel element (CCE) monitoring.

Example 23 comprises the subject matter of Example 21, wherein the splitting is based on a number of BDs available or a number of non-overlapping CCE monitoring instances available.

Example 24 comprises the subject matter of Example 21, wherein the splitting is based on a percentage of resources to use for uplink cancellation request monitoring or a percentage of resources to use for prioritization monitoring.

Example 25 comprises the subject matter of Example 21, wherein the amount of uplink monitoring resources available is predetermined.

Example 26 comprises the subject matter of Example 21, wherein the wireless device is configured to determine amount of uplink monitoring resources available by: transmitting, to the wireless station, the indication of the split monitoring resources; and receiving, from the wireless station, configuration information for the split monitoring resources.

Yet another exemplary embodiment may include a method, comprising: by a device: performing any or all parts of the preceding examples.

A yet further exemplary embodiment may include a non-transitory computer-accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device comprising:
   an antenna;
   a radio operably coupled to the antenna; and
   a processor operably coupled to the radio;
   wherein the wireless device is configured to:
   determine an amount of uplink monitoring resources that are available for uplink cancellation request monitoring and prioritization request monitoring, the uplink monitoring including:
   resources for monitoring a wireless device search space (UESS), the UESS resources monitoring a Physical Downlink Control Channel (PDCCH) scheduling for an uplink interval corresponding to a first priority for a first application running on the wireless device, or higher priority traffic of another application running on the wireless device, and allowing prioritization between applications with different priorities running on the wireless device, and
   resources for monitoring a common search space (CSS), the CSS resources monitoring a Group Common PDCCH that includes an uplink cancellation indication that allows prioritization between wireless devices with different priorities;
   determine a maximum amount of the uplink monitoring resources useable for monitoring for the uplink cancellation indication on the CSS;
   split the monitoring resources between uplink cancellation monitoring and prioritization monitoring based on the determined maximum amount of the uplink monitoring useable for monitoring on the CSS;
   transmit, to a wireless station, an indication of the split monitoring resources; and
   receiving, from the wireless station, an indication of an uplink cancellation level when scheduling the PDCCH; and
   monitor an amount of the CSS and UESS based on the split monitoring resources and the uplink cancelation level.

2. The wireless device of claim 1, wherein the uplink monitoring resources comprise blind decodes (BDs) and non-overlapping control channel element (CCE) monitoring.

3. The wireless device of claim 1, wherein the splitting is based on a number of BDs available or a number of non-overlapping CCE monitoring instances available.

4. The wireless device of claim 1, wherein the amount of uplink monitoring resources available is predetermined.

5. The wireless device of claim 1, wherein the indicated amount of monitoring resources is one of:
   no monitoring for uplink cancellation requests; and
   no monitoring for prioritization requests.

6. The wireless device of claim 1, wherein the indicated amount of monitoring resources indicates a percentage split of resources available for monitoring for uplink cancellation requests and prioritization requests.

7. The wireless device of claim 1, wherein a level of support for split monitoring is transmitted as a part of a resource schedule request or as a part of a wireless device capability signaling.

8. A method for uplink monitoring, comprising:
   determining an amount of uplink monitoring resources that are available for uplink cancellation request monitoring and prioritization request monitoring, the uplink monitoring resources comprising:
   resources for monitoring a wireless device search space (UESS), the UESS resources monitoring a Physical Downlink Control Channel (PDCCH) scheduling for an uplink interval corresponding to a first priority for a first application running on the wireless device, or higher priority traffic of another application running on the wireless device, and allowing prioritization between applications with different priorities running on the wireless device, and
   resources for monitoring a common search space (CSS), the CSS resources monitoring a Group Common PDCCH that includes an uplink cancellation indication that allows prioritization between wireless devices with different priorities;

determining a maximum amount of the uplink monitoring resources useable for monitoring for uplink cancellation requests on the CSS;

splitting the monitoring resources between uplink cancellation monitoring and prioritization monitoring based on the determined maximum amount of the uplink monitoring useable for monitoring on the CSS;

transmitting, to a wireless station, an indication of the split monitoring resources;

receiving, from the wireless station, an indication of an uplink cancellation level when scheduling the PDCCH; and monitoring an amount of the CSS and wireless device search space (DESS) based on the split monitoring resources and the uplink cancellation level.

9. The method of claim 8, wherein the uplink monitoring resources comprise blind decodes (BDs) and non-overlapping control channel element (CCE) monitoring.

10. The method of claim 8, wherein the indicated amount of monitoring resources indicates a percentage split of resources available for monitoring for uplink cancellation requests and prioritization requests.

11. The method of claim 8, wherein the indicated amount of monitoring resources is one of:
no monitoring for uplink cancellation requests; and
no monitoring for prioritization requests.

12. The method of claim 8, wherein a level of support for split monitoring is transmitted as a part of a resource schedule request or as a part of a wireless device capability signaling.

13. A non-transitory computer-readable medium that stores instructions that, when executed, cause one or more processor of a device to:
determine an amount of uplink monitoring resources that are available for uplink cancellation request monitoring and prioritization request monitoring, the uplink monitoring including:
resources for monitoring a wireless device search space (UESS), the UESS resources monitoring a Physical Downlink Control Channel (PDCCH) scheduling for an uplink interval corresponding to a first priority for a first application running on the wireless device, or higher priority traffic of another application running on the wireless device, and allowing prioritization between applications with different priorities running on the wireless device, and
resources for monitoring a common search space (CSS), the CSS resources monitoring a Group Common PDCCH that includes an uplink cancellation indication that allows prioritization between wireless devices with different priorities;
determine a maximum amount of the uplink monitoring resources useable for monitoring for the uplink cancellation indication on the CSS;
split the monitoring resources between uplink cancellation monitoring and prioritization monitoring based on the determined maximum amount of the uplink monitoring useable for monitoring on the CSS;
transmit, to a wireless station, an indication of the split monitoring resources;
receiving, from the wireless station, an indication of an uplink cancellation level when scheduling the PDCCH; and
monitor an amount of the CSS and UESS based on the split monitoring resources and the uplink cancellation level.

14. The non-transitory computer-readable medium of claim 13, wherein the uplink monitoring resources comprise blind decodes (BDs) and non-overlapping control channel element (CCE) monitoring.

15. The non-transitory computer-readable medium of claim 13, wherein the indicated amount of monitoring resources indicates a percentage split of resources available for monitoring for uplink cancellation requests and prioritization requests.

16. The non-transitory computer-readable medium of claim 13, wherein the indicated amount of monitoring resources is one of:
no monitoring for uplink cancellation requests; and
no monitoring for prioritization requests.

17. The non-transitory computer-readable medium of claim 13, wherein a level of support for split monitoring is transmitted as a part of a resource schedule request or as a part of a wireless device capability signaling.

* * * * *

UNITED STATES PATENT AND TRADEMARK OFFICE
CERTIFICATE OF CORRECTION

PATENT NO. : 12,035,407 B2
APPLICATION NO. : 17/225640
DATED : July 9, 2024
INVENTOR(S) : Oghenekome Oteri et al.

It is certified that error appears in the above-identified patent and that said Letters Patent is hereby corrected as shown below:

In the Claims

Column 25, Line 14: replace the word "(DESS)" with the word --(UESS)--

Signed and Sealed this
Sixth Day of August, 2024

Katherine Kelly Vidal
*Director of the United States Patent and Trademark Office*